US012146061B2

(12) United States Patent
Wideman et al.

(10) Patent No.: US 12,146,061 B2
(45) Date of Patent: Nov. 19, 2024

(54) SEALANT SYSTEM AND METHODS OF USE AND MANUFACTURE

(71) Applicant: TMSCSP LLC, Lindale, TX (US)

(72) Inventors: David Wideman, Lindale, TX (US); Robert Humphrey, Auburn, GA (US)

(73) Assignee: TMSCSP, LLC, Lindale, TX (US)

( * ) Notice: Subject to any disclaimer, the term of this patent is extended or adjusted under 35 U.S.C. 154(b) by 110 days.

(21) Appl. No.: 17/899,158

(22) Filed: Aug. 30, 2022

(65) Prior Publication Data

US 2022/0403171 A1    Dec. 22, 2022

Related U.S. Application Data

(62) Division of application No. 16/885,191, filed on May 27, 2020, now abandoned.

(60) Provisional application No. 62/861,815, filed on Jun. 14, 2019.

(51) Int. Cl.
| | |
|---|---|
| *C08L 83/04* | (2006.01) |
| *C08K 3/013* | (2018.01) |
| *C08K 5/5465* | (2006.01) |
| *C08L 23/06* | (2006.01) |

(52) U.S. Cl.
CPC .............. *C08L 83/04* (2013.01); *C08K 3/013* (2018.01); *C08K 5/5465* (2013.01); *C08L 23/06* (2013.01); *C08L 2205/16* (2013.01)

(58) Field of Classification Search
CPC ...... C08L 83/04; C08L 23/06; C08L 2205/16; C08K 3/013; C08K 5/5465
USPC .......................................................... 156/329
See application file for complete search history.

(56) References Cited

U.S. PATENT DOCUMENTS

| | | | |
|---|---|---|---|
| 4,460,737 | A | 7/1984 | Evans et al. |
| 4,778,529 | A | 10/1988 | Barker et al. |
| 5,214,095 | A * | 5/1993 | Lavoie ................ C08G 77/442 |
| | | | 524/832 |
| 5,714,563 | A | 2/1998 | DePompei et al. |
| 7,297,065 | B2 | 11/2007 | Wang |
| 7,767,291 | B2 | 8/2010 | Taylor |
| 8,642,688 | B2 | 2/2014 | Jung et al. |
| 9,314,815 | B2 | 4/2016 | Soelch et al. |
| 9,896,601 | B2 | 2/2018 | Setzke |
| 10,005,254 | B2 | 6/2018 | Hyer et al. |
| 10,100,165 | B2 | 10/2018 | Wilken et al. |
| 10,118,322 | B2 | 11/2018 | Mizuta et al. |
| 2005/0288415 | A1 * | 12/2005 | Beers ...................... C08L 75/04 |
| | | | 524/425 |
| 2008/0115827 | A1 | 5/2008 | Woods et al. |

* cited by examiner

*Primary Examiner* — Ling Siu Choi
*Assistant Examiner* — Ronald Grinsted
(74) *Attorney, Agent, or Firm* — Lance C. Venable; Law Office of Lance C. Venable, PLLC

(57) ABSTRACT

A roof sealing system method of manufacture and method of application comprising three parts: a caulk gap filler, a mastic, and a top coating. All three components combine to create a singular sealed membrane when applied to a roof surface. The roof sealing system utilizes inert polyethylene fibers in a liquid silicone polymer.

20 Claims, 2 Drawing Sheets

Method of Use

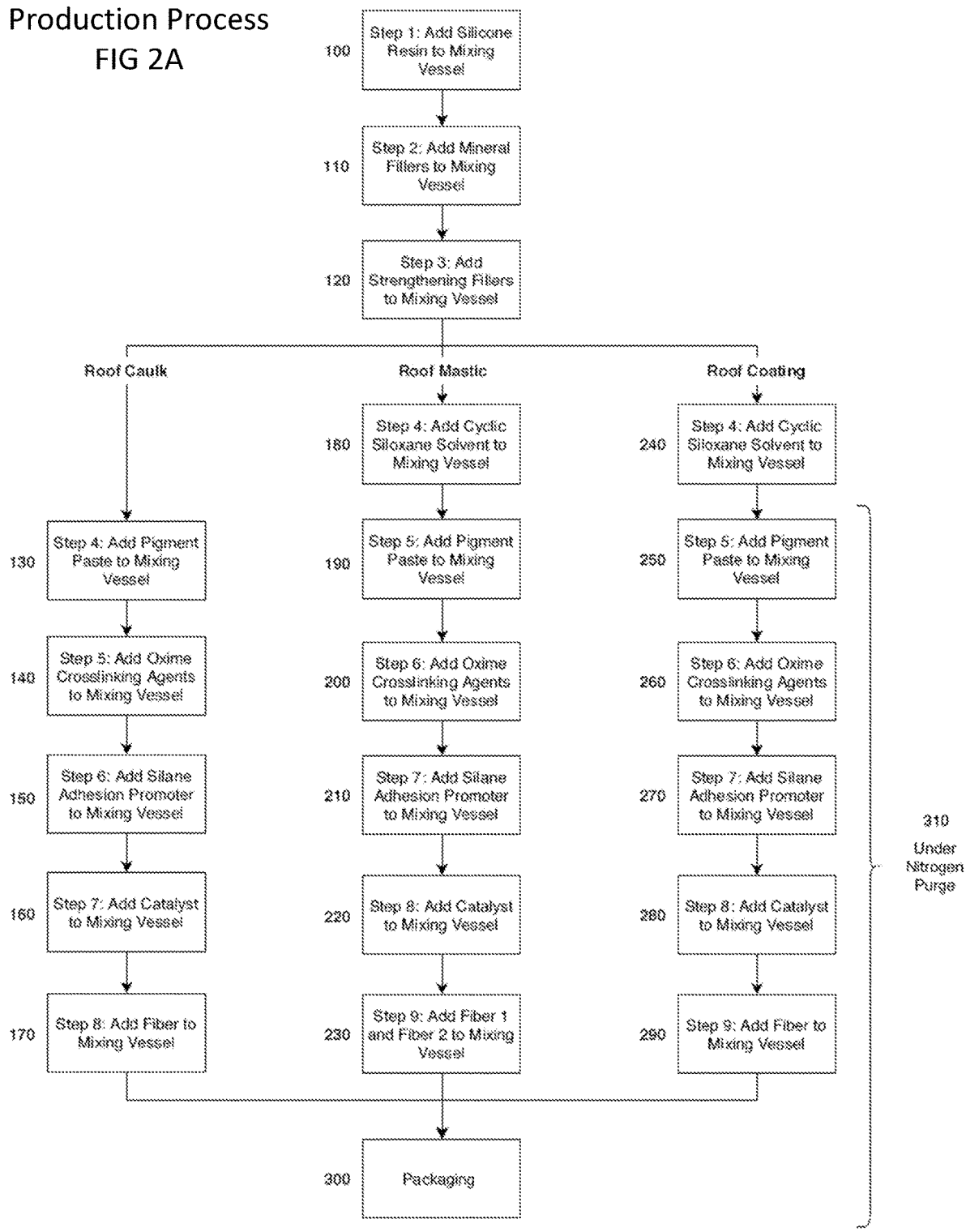

SEALANT SYSTEM AND METHODS OF USE AND MANUFACTURE

BACKGROUND OF THE INVENTION

This invention generally pertains to the field of sealants, and more particularly roofing sealants and waterproofing. More specifically, this invention relates to a fiber-infused caulk, mastic, and coating, as well as a system and method for manufacture and application. While the caulk layer, mastic layer, and coating layer work as a system in this embodiment, one of ordinary skill in the art would understand they can be used individually as well.

Membrane roofing systems typically involve applying large pieces of a synthetic rubber, thermoplastic or modified bitumen material onto an underlying roofing structure, such as plywood, and bonding or heat sealing seams together to form a continuous and coherent membrane structure that prevents water from penetrating the membrane and underlying structures. Membrane roofing differs from asphalt and gravel roofing or shingle roofing in that it creates a single bonded membrane structure.

Synthetic rubber roofing uses sheets of rubber which are bonded together along the edges to create a solid sealed layer. This results in seams where the rubber sheeting is bonded together, creating weak points where water leakage can occur. The most commonly used synthetic rubber is ethylene propylene diene monomer (EPDM). EPDM and other synthetic rubber roofing materials can withstand ultraviolet radiation, are waterproof, puncture resistant and are chemically resistant.

Thermoplastics use lap joints to create a sealed surface. Sheets of thermoplastic material are overlapped at the edges, and bonded together using heat or solvents. Similar to synthetic rubber, this process creates seams which are prone to water leakage. Thermoplastic roofing also requires a fabric-based reinforcement layer under the thermoplastic sheeting. The most common form of thermoplastic roofing is polyvinyl chloride (PVC).

Bitumen roofing is a layer of asphalt-based sheeting. Sheets of the asphalt material are sealed together by heating the asphalt. This creates seams which are prone to leakage, and heating the asphalt releases chemicals. The downside of the existing membrane options is that they must have holes cut in them for vents and pipes, which must then be sealed with mastic, fabric, or asphalt to prevent water infiltration.

Conventional membrane roofing relies on the seals between individual sections of the roofing material being watertight. Likewise, the seals created around pipes and vents must be watertight. The three membrane roofing material types do not create an effective seamless barrier, as the seams can be weaker than the material itself. Installation of conventional membrane roofing can require equipment to heat and seal the joints. It can also require significant experience to fit patches around piping and vents in the roof. Additionally, current membrane roofing options also use and emit volatile organic compounds (VOC) during installation and use because of VOC solvents used during production. There is, therefore, a present need for improvement and a more user-friendly option for roofing.

SUMMARY OF THE INVENTION

Described herein are various embodiments of systems, methods and components for roofing material sealing and waterproofing.

In accordance with one embodiment, the system comprises a system including a roof caulk, a roof mastic and a roof coating. In this embodiment, the roof caulk fills seams, joints, cracks, and existing penetrations such as pipes, vents, and edges. Roof caulk is the first applied layer of the roofing system. In this embodiment, the roof caulk may be comprised of a fiber-infused silicone polymer resin, which may optional further include pigments, strengthening fillers and/or mineral fillers.

Additionally, the system comprises a roof mastic configured to coat the caulk-filled seams, joints, cracks, or penetrations. Roof mastic is the second applied layer of the roofing system. In this embodiment, the mastic creates a smooth surface for the coating to adhere to by sealing the caulk into the gaps, crevices, and openings around vents and pipes. In this embodiment, the roof mastic may be comprised of fiber-infused silicone polymer resin with strengthening and mineral fillers. In some embodiments, cyclic siloxane is added to control viscosity.

Additionally, in this embodiment, the system comprises a roof coating designed to coat the entire surface of the roof. Roof coating is the third applied layer of the roofing system. The coating may be applied to the entirety of the roof surface in two or more coats to ensure a seamless membrane is achieved. In this embodiment, the roof coating may be comprised of a fiber-infused silicone polymer resin with strengthening and mineral fillers. The fiber used in the silicone polymer resin may be polymer, natural fibers such as cotton, flax, jute, hemp or sisal, cellulose, ceramic, glass or the like. In accordance with one embodiment, the fiber may be a plant fiber, mineral fiber, synthetic fiber, regenerated fiber, or semi-synthetic fiber. Synthetic fibers may be selected from the group consisting of polyethylene, polyethylene terephthalate, polyurethane, polypropylene, polyester, polyamide, nylon, polyacrylonitrile, poly-paraphenyulene terepthalamide, and aramids. In some embodiments, cyclic siloxane may be added as a solvent to control viscosity of the resin.

In operation of the system, the three components may be applied in series to a roof to create a seamless, watertight membrane on the roof surface. The roof sealing system may be applied on an existing membrane roof or directly on to the roof decking. The method of applying the system may comprise the steps of applying the roof caulk to fill larger gaps in the roof substrate and sealing any penetrations around pipes, vents, edges, joints, seams, and cracks, then applying the mastic over the caulk to create a sealed barrier wherein the mastic smooths the surface in preparation for application of the coating, applying the roof coating to the entirety of the roof, in two or more applications with a roller, brush, or spray, to completely seal the surface of the roof. In this embodiment, watertight barrier, which is cured by ambient moisture, is formed and requires no maintenance after initial installation. By employing fibers in the resin no fabric reinforcing layer is needed. The lower viscosity of the roof sealing system allows for complete adherence to the roof surface without the need for additional adhesives.

In one embodiment, the three components may be manufactured in a similar method with some variations in viscosity due to different length fibers or the addition of the cyclic siloxane solvent in the mastic and the coating. First, silicone polymers are added to a mixing vessel and combined with mineral fillers and strengthening fillers. In some embodiments, cyclic siloxane may be added as a solvent to reduce viscosity, and pigment may be added to the mixing vessel. A nitrogen purge may be used to expel any excess air and moisture. In some embodiments, crosslinking agents may be added to obtain a desired crosslink density in the cured product, a adhesion promoter may be added to ensure complete adherence to roofing substrates, and a catalyst may be added to adjust the cure characteristics. In this embodiment, all ingredients are mixed until they are homogenized completely. Finally, in some embodiments, the fibers may be added to the mixture to increase tenacity and scratch resistance.

The methods, systems, and apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not intended to be restrictive of the methods, apparatuses, and systems, as claimed.

BRIEF DESCRIPTION OF THE DRAWINGS

In the accompanying figures, like elements are identified by like reference numerals among the several preferred embodiments of the present invention.

FIG. 2A is a diagram illustrating the method of manufacture of the caulk, mastic, and coating components of the roof sealing system.

DETAILED DESCRIPTION OF THE PREFERRED EMBODIMENTS

Figure 1A:
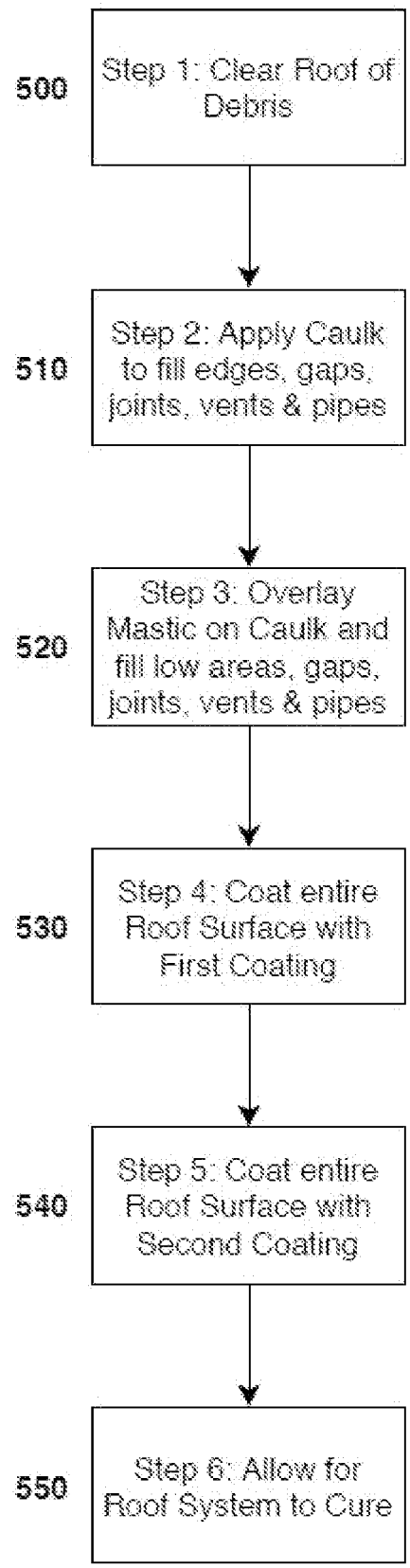
FIG. 1A is a diagram illustrating the method of application of the roof sealing system to a roof surface.

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

For purposes of clarity, the following terms used in this patent application will have the following meanings:

"Substantially" is intended to mean a quantity, property, or value that is present to a great or significant extent and less than totally.

"About" is intended to mean a quantity, property, or value that is present at ±10%.

"Solvent" as used here is intended to mean any substance used to modify viscosity.

In accordance with the present invention there is provided a roof sealing system (FIG. 1A). The system comprises generally a caulk layer, a mastic layer, and a coating layer. Each of the caulk layer, mastic layer, and coating layer comprise a fiber-infused silicone material. As shown in FIG. 1A, the caulk layer is applied first to cracks, openings, joints, seams, vents, pipes, and crevices in the roofing substrate 510. The mastic layer is then overlaid 520 on the caulk layer and used to build up low areas to create a smooth surface to which the coating layer may adhere. The coating layer is then applied to the entirety of the roof surface in two or more coats to create a single, seamless, roof membrane 530. The three components utilize a similar method of manufacture varying the process steps and process parameters.

Caulk

In one embodiment, the roof caulk is the first applied layer of the roofing system 510. The caulk creates a base layer for the mastic overlay and ensures small pockets of water will not occur on the roof surface. The caulk is delivered by dispersing a bead into cracks, gaps, edges, and joints 510 from a standard caulk dispenser.

In this embodiment, the roof caulk may comprise a silicone polymer resin, strengthening fillers, mineral fillers, pigment, crosslinking agents, adhesion promoters, a catalyst, and inert fiber combined under high shear mixing and blanketed by nitrogen.

In one aspect of the roof caulk, the silicone polymer resin comprises a hydroxyl-endcapped polydimethylsiloxane silanol fluid having a viscosity of 2,000 centipoise, specific gravity of 0.980, and refractive index of 1.4058, at 25 degrees Celsius. Condensation curing is the mechanism employed to cure the system, and achieved using a crosslinking agent and catalyst, as discussed below.

In another aspect of the roof caulk, the strengthening filler comprises a hydrophilic medium surface fumed silica having a specific surface area of 200 square meters per gram, a content of greater than 99.8% silicon dioxide, and a volume mass of 25-60 grams per liter. The strengthening filler increases tensile strength in the cured product, and must be added under high shear mixing to ensure complete dispersion.

In yet another aspect of the roof caulk, the mineral filler comprises a ground crystalline silica powder having a content of 98.5% silicon dioxide, a particle size of 5.0 microns, a specific gravity of 2.65, a Hegman fineness of 7.0-7.5, and a Mohs hardness of 7.0. The mineral filler is added to increase hardness, tenacity, and volume of the finished product.

In yet another aspect of the roof caulk, the pigment comprises a rutile titanium dioxide pigment having a content of 91% titanium dioxide, a specific gravity of 4.0, a pH of 7.5, and an average particle size of 0.23 square micrometers. The pigment is extremely durable and improves light reflectivity of the roof sealing system, which reduces transferred heat into the substrate and underlying roof and building structure.

In this embodiment, two crosslinking agents are used to achieve effective curing of the product. Methyltris(methylethylketoxime)silane and a blend of 90 weight percent methyltris(methylethylketoxime)silane and 10 weight percent tetra(methylethylketoxime) silane oxime crosslinking agents are utilized. Methyltris(methylethylketoxime)silane has a density of 0.9750 grams per cube centimeter at 20 Celsius and the appearance of a colorless transparent liquid. The blend of 90 percent methyltris(methylethylketoxime) silane and 10 percent tetra(methylethylketoxime) silane has a variable density and the appearance of a colorless transparent liquid. These crosslinking agents are added according to the molar quantity required to ensure a desired crosslink density in the cured product. In the presence of a dibutyltin dilaurate catalyst, these crosslinking agents react with the roofing system resulting in exposure to ambient moisture causing the formation of crosslinked, elastomeric silicones, effectively curing the product.

In this embodiment, the adhesion promoter comprises aminoethylaminopropyl-trimethoxysilane adhesion promoter having a minimum purity of 97%, a molecular weight of 222.36 atomic mass units, a density of 1.028 grams per cube centimeter, and a boiling point of 259 Celsius. The purpose of the adhesion promoter is to improve adherence of the roofing system to the roof substrate. This is achieved by using the silane adhesion promoter as a coupling agent to provide elongation, flexibility, and spreading at the interface of the silicone polymer. This promotes adhesion between the roofing system and the roof surface by introducing reactive amino groups that facilitate adhesion between the polymer and roof surface.

Additionally in this embodiment, the catalyst comprises a tin-based dibutyltin dilaurate catalyst having a tin content of 17-19%, a density of 1.07 grams per cube centimeter and a refractive index of 1.471 at 25 Celsius, and a boiling point of 204 Celsius. In this aspect, the catalyst is added to adjust the cure characteristics of the roofing system by promoting rapid gelation of the silicone roof sealing system and tack-free drying time. Additionally, this catalyst improves mechanical properties in the cured roof membrane.

With regard to fiber in this embodiment, the fiber comprises a fibrillated high density polyethylene fiber having an average length of 0.6 millimeters, diameter of 5 microns, and surface area of 12 square meters per gram. The fiber is added increase tenacity and scratch resistance in the finished product, and may increase the viscosity based on length and diameter of the fiber. The fibrillation ensures effective cross-linking, making the caulk more robust.

Additionally, in this embodiment, one having ordinary skill in the art will understand that several other ingredients can be substituted in place of the ones listed. In this embodiment, substitutions can be made for the polymer resin, strengthening fillers, mineral fillers, pigment, cross-linking agents, adhesion promoter, catalyst, and fiber.

In this embodiment, the silicone resin may comprise any organosilicon compound of functionally similar viscosity to that described in this application, including, for example polydimethylsiloxanes, such as endcapped-polydimethylsiloxane, OH-endcapped polydimethylsiloxane, polyhexamethyldisiloxane, octamethyltrisiloxane, decamethyltetrasiloxane, dodecamethylpentasiloxane, polyethylsiloxane, hydroxypropyl terminated polydimethylsiloxane, hydroxyl terminated dimethyl-methylvinyl polysiloxane, hydroxyl terminated dimethyl-methylphenyl polysiloxane, hydroxyl terminated dimethyl-methylphenyl siloxane, silinol terminated dimethyl-diphenyl polysiloxane, hydroxyl terminated poly(methyl-trifluoropropyl)siloxane, or combinations thereof.

In this embodiment, the strengthening filler can comprise any hydrophilic fumed silica having similar purity and surface area as the fumed silica mentioned above.

In this embodiment, the mineral filler may be comprised of calcium carbonate, barium sulfate, iron oxide, diatomaceous earth, melamine, quartz, crystalline silica, amorphous silica, fumed silica, titanium dioxide, alumina trihydrate, zinc oxide, zirconium oxide, zirconium silicate, zinc borate, chromic oxide, crystalline silica fine powder, amorphous silica fine powder, fumed silica powder, silicone rubber powder, glass powder, silica hydrogen, silica aero gel, calcium silicate, aluminum silicate, aluminum oxide, ferrite, carbon black, graphite, mica, clay, bentonite, or any combination thereof.

In this embodiment, the pigment may be comprised of zinc oxide, antimony oxide, zirconium oxide, chromium oxide, iron oxide, lead oxide, zinc sulfide, titanium dioxide, lithopone, or any combination thereof.

In this embodiment, the crosslinking agents may comprise any ketoxime silane including, but not limited to, phenyl tris(methylethylketoxime)silane, vinyl tris(methylethylketoxime)silane, dimethyl bis(methylethylketoxime)silane, tetra(methylethylketoxime)silane, methyl tris(methylethylketoxime)silane, or any combination thereof.

In this embodiment, the adhesion promoter may be comprised of aminoethylaminopropyl-trimethoxysilane, 3-(2-Aminoethylamino) propyldimethoxymethylsilane, N-3-(Trimethoxysilyl)propylethylenediamine, vinyltris(2-methoxyethoxy)silane, 3-methacryloxypropyltrimethoxysilane, 2-(3,4-epoxycyclohexyl)ethyl trimethoxysilane, 3-glycidoxypropyltrimethoxysilane, 3-glycidoxypropylmethyldiethoxysilane, N-(2-aminoethyl)3-aminopropyltrimethoxysilane, 3-aminopropyltriethoxysilane, 3-(N-aminomethylbenzylamino)propyltrimethoxysilane, 3-mercaptopropyltrimethoxysilane, 3-aminopropyltris(methylethylketoxime) silane, 3-glycidoxy propyltriisopropenoxysilane, and 3-glycidoxypropylmethyldiisopropenoxysilane, or any combination thereof.

In this embodiment, the catalyst may be comprised of dibutyltin diacetate, stannous octoate, dibutyltin dioctoate, dibutyltin dilaurate, dibutyltin dimethoxide, dibutyltin bis (acetylacetonate), dibutyltin bis(benzylmalate), dimethyltin dimethoxide, dimethyltin diacetate, dioctyltin dioctate, dioctyltin dilaurate, tin dioctate, tin laulate, tetraisopropyl titanate, tetra-n-butyl titanate, tetra-tertiary butyl titanate, tetra-n-propyl titanate, tetra-2-ethylhexyl titanate, diisopropyl di-tertiary butyl titanate, dimethoxy titanium bisacetylacetonate, diisopropoxy titanium bisethyl acetoacetate, di-tertiary butoxy titanium bisethyl acetoacetate, and di-tertiary butoxy titanium bismethyl acetoacetate, or any combination thereof.

In this embodiment, the fiber may be comprised of any polymer, natural fibers such as cotton, flax, jute, hemp or sisal, cellulose, ceramic, glass or the like. In accordance with this embodiment, the fiber may be a plant fiber, mineral fiber, synthetic fiber, regenerated fiber, or semi-synthetic fiber. Synthetic fibers may be selected from the group consisting of polyethylene, polyethylene terephthalate, polyurethane, polypropylene, polyester, polyamide, nylon, polyacrylonitrile, poly-paraphenyulene terepthalamide, aramids, or combinations thereof.

Table 1, below, sets for an example of a formulation of the roof caulk in accordance with the present invention, in addition to preferred or permissible ranges of each component in the formulation:

TABLE 1

| Component | Wt % | Permissible Range |
|---|---|---|
| Silicone Polymer Resin | 55.35 | 40.35-70.0 |
| Pigment | 5.0 | 5.0-13.0 |
| Mineral Filler | 24.7 | 15.0-40.0 |
| Strengthening Filler | 5.6 | 2.0-8.0 |
| Crosslinker 1 | 5.3 | 3.0-13.0 |
| Crosslinker 2 | 2.75 | 0.0-5.0 |
| Adhesion Promoter | 0.8 | 0.2-1.0 |
| Fiber | 0.4 | 0.1-2.0 |
| Catalyst | 0.1 | 0.0-1.0 |

Mastic

The roof mastic of the system comprises similar ingredients and a similar formulation as the roof coating, except that the mastic has a higher viscosity than the coating to allow it to be spread by troweling as opposed to application by brush, roller, or sprayer. The higher viscosity is achieved by increased size and fiber content, which employs two fiber components as opposed to one in the coating.

As shown in FIG. 1A, the roof mastic is applied on top of the roof caulk 520. Viscosity of the mastic is lower than caulk. Mastic is designed to be delivered by trowel application to build up areas and fill larger gaps prior to applying coating 520.

In this embodiment, the roof mastic may be comprised of a silicone polymer resin, strengthening fillers, mineral fillers, solvent, pigment, crosslinking agents, adhesion promoters, catalyst, and inert fiber combined under high shear mixing and blanketed by nitrogen.

In one aspect of the roof mastic, the silicone polymer resin comprises a hydroxyl endcapped polydimethylsiloxane silanol fluid having a viscosity of 2,000 centipoise, specific gravity of 0.980, and refractive index of 1.4058, at 25 degrees Celsius. Condensation curing is the mechanism employed to cure the system, and achieved using the oxime crosslinking agent and catalyst discussed below.

In another aspect of the roof mastic, the strengthening filler comprises a hydrophilic medium surface fumed silica having a specific surface area of 200 square meters per gram, a content of greater than 99.8% silicon dioxide, and a volume mass of 25-60 grams per liter. The strengthening filler increases tensile strength in the cured product, and must be added under high shear mixing to ensure complete dispersion.

In yet another aspect of the roof mastic, the mineral filler comprises a ground crystalline silica powder having a content of 98.5% silicon dioxide, a particle size of 5.0 microns, a specific gravity of 2.65, a Hegman fineness of 7.0-7.5, and a Mohs hardness of 7.0. The mineral filler is added to increase hardness, tenacity, and volume of the finished product.

In yet another aspect of the roof mastic, the cyclic siloxane solvent used comprises a decamethylcyclopentasiloxane having a content of 96.0% decamethylcyclopentasiloxane. This cyclic siloxane is volatile organic compound (VOC) exempt, and gives off no VOC's during installation, curing, or its useful lifetime. The cyclic siloxane may be added to adjust the viscosity of the composition.

In this embodiment, the pigment comprises a rutile titanium dioxide pigment having a content of 91% titanium dioxide, a specific gravity of 4.0, a pH of 7.5, and an average particle size of 0.23 square micrometers. The pigment is extremely durable and improves light reflectivity of the roof sealing system, which reduces transferred heat into the structure.

In this embodiment, two crosslinking agents are used to achieve effective curing of the product. Methyltris(methylethylketoxime)silane and a blend of 90 weight percent methyltris(methylethylketoxime)silane and 10 weight percent tetra(methylethylketoxime) silane oxime crosslinking agents are utilized. Methyltris(methylethylketoxime)silane has a density of 0.9750 grams per cube centimeter at 20 Celsius and the appearance of a colorless transparent liquid. The blend of 90 percent methyltris(methylethylketoxime) silane and 10 percent tetra(methylethylketoxime) silane has a variable density and the appearance of a colorless transparent liquid. These crosslinking agents are added according to the molar quantity required to ensure the correct crosslink density in the cured product. In the presence of the dibutyltin dilaurate catalyst, these crosslinking agents react with ambient moisture causing the formation of crosslinked, elastomeric silicones, effectively curing the product.

In this embodiment, the adhesion promoter comprises an aminoethyl-aminopropyltrimethoxysilane adhesion promoter having a minimum purity of 97%, a molecular weight of 222.36 atomic mass units, a density of 1.028 grams per cube centimeter, and a boiling point of 259 Celsius. The purpose of the adhesion promoter is to improve adherence of the roofing system to the roof substrate. This is achieved by using the silane adhesion promoter as a coupling agent to provide elongation, flexibility, and spreading at the interface of the silicone polymer. This promotes adhesion between the roofing system and the roof surface by introducing reactive amino groups that facilitate adhesion between the polymer and roof surface.

In this embodiment, the catalyst comprises a tin based dibutyltin dilaurate catalyst having a tin content of 17-19%, a density of 1.07 grams per cube centimeter and a refractive index of 1.471 at 25 Celsius, and a boiling point of 204 Celsius. This catalyst is added to adjust the cure characteristics of the roofing system by promoting rapid gelation of the silicone roof sealing system and tack-free drying time. Additionally, this catalyst improves mechanical properties in the cured roof membrane.

With regard to fiber in this embodiment, two different sized fibers are added to increase the viscosity and allow the mastic to be troweled on. The first inert fiber comprises a fibrillated high density polyethylene fiber having an average length of 0.6 millimeters, diameter of 5 microns, and surface area of 12 square meters per gram. The second inert fiber comprises a fibrillated high density polyethylene fiber having an average length of 0.7 millimeters, diameter of 15 microns, and surface area of 8 square meters per gram. The fiber is added increase tenacity and scratch resistance in the finished product, and may increase the viscosity based on length and diameter of the fiber. The fibrillation ensures effective crosslinking, making the mastic more robust.

Additionally, in this embodiment, one having ordinary skill in the art will understand that several other ingredients can be substituted in place of the ones listed. In this embodiment, substitutions can be made for the polymer resin, strengthening fillers, mineral fillers, solvent, pigment, crosslinking agents, adhesion promoter, catalyst, and fiber.

In this embodiment, the silicone resin may comprise any organosilicon compound of functionally similar viscosity to that described in this application, including, for example polydimethylsiloxanes, such as endcapped-polydimethylsiloxane, OH-endcapped polydimethylsiloxane, polyhexamethyldisiloxane, octamethyltrisiloxane, decamethyltetrasiloxane, dodecamethylpentasiloxane, polyethylsiloxane, hydroxypropyl terminated polydimethylsiloxane, hydroxyl terminated dimethyl-methylvinyl polysiloxane, hydroxyl terminated dimethyl-methylphenyl polysiloxane, hydroxyl terminated dimethyl-methylphenyl siloxane, silinol terminated dimethyl-diphenyl polysiloxane, hydroxyl terminated poly(methyl-trifluoropropyl)siloxane, or combinations thereof.

In this embodiment, the strengthening filler can comprise any hydrophylic fumed silica having similar purity and surface area as the fumed silica mentioned above.

In this embodiment, the mineral filler may be comprised of calcium carbonate, barium sulfate, iron oxide, diatomaceous earth, melamine, quartz, crystalline silica, amorphous silica, fumed silica, titanium dioxide, alumina trihydrate, zinc oxide, zirconium oxide, zirconium silicate, zinc borate, chromic oxide, crystalline silica fine powder, amorphous silica fine powder, fumed silica powder, silicone rubber powder, glass powder, silica hydrogen, silica aero gel, calcium silicate, aluminum silicate, aluminum oxide, ferrite, carbon black, graphite, mica, clay, bentonite, or any combination thereof.

In this embodiment, the solvent may be comprised of any cyclic siloxane, including, but not limited to, octamethylcyclotetrasiloxane, dodecamethylcyclohexasiloxane, decamethylcyclopentasiloxane, or any combination thereof.

In this embodiment, the pigment may be comprised of zinc oxide, antimony oxide, zirconium oxide, chromium oxide, iron oxide, lead oxide, zinc sulfide, titanium dioxide, lithopone, or any combination thereof.

In this embodiment, the crosslinking agents may comprise any ketoxime silane including, but not limited to, phenyl tris(methylethylketoxime)silane, vinyl tris(methylethylketoxime)silane, dimethyl bis(methylethylketoxime)silane, tetra(methylethylketoxime)silane, methyl tris(methylethylketoxime)silane ("MOS"), or any combination thereof.

In this embodiment, the adhesion promoter may be comprised of aminoethylaminopropyl-trimethoxysilane, 3-(2-Aminoethylamino) propyldimethoxymethylsilane, N-3-(Trimethoxysilyl)propylethylenediamine, vinyltris(2-methoxyethoxy)silane, 3-methacryloxypropyltrimethoxysilane, 2-(3,4-epoxycyclohexyl)ethyl trimethoxysilane, 3-glycidoxypropyltrimethoxysilane, 3-glycidoxypropylmethyldiethoxysilane, N-(2-aminoethyl)3-aminopropyltrimethoxysilane, 3-aminopropyltriethoxysilane, 3-(N-aminomethylbenzylamino)propyltrimethoxysilane, 3-mercaptopropyltrimethoxysilane, 3-aminopropyltris(methylethylketoxime) silane, 3-glycidoxy propyltriisopropenoxysilane, and 3-glycidoxypropylmethyldiisopropenoxysilane, or any combination thereof.

In this embodiment, the catalyst may be comprised of dibutyltin diacetate, stannous octoate, dibutyltin dioctoate, dibutyltin dilaurate, dibutyltin dimethoxide, dibutyltin bis(acetylacetonate), dibutyltin bis(benzylmalate), dimethyltin dimethoxide, dimethyltin diacetate, dioctyltin dioctate, dioctyltin dilaurate, tin dioctate, tin laulate, tetraisopropyl titanate, tetra-n-butyl titanate, tetra-tertiary butyl titanate, tetra-n-propyl titanate, tetra-2-ethylhexyl titanate, diisopropyl di-tertiary butyl titanate, dimethoxy titanium bisacetylacetonate, diisopropoxy titanium bisethyl acetoacetate, di-tertiary butoxy titanium bisethyl acetoacetate, and di-tertiary butoxy titanium bismethyl acetoacetate, or any combination thereof.

In this embodiment, the fiber may be comprised of any polymer, natural fibers such as cotton, flax, jute, hemp or sisal, cellulose, ceramic, glass or the like. In accordance with this embodiment, the fiber may be a plant fiber, mineral fiber, synthetic fiber, regenerated fiber, or semi-synthetic fiber. Synthetic fibers may be selected from the group consisting of polyethylene, polyethylene terephthalate, polyurethane, polypropylene, polyester, polyamide, nylon, polyacrylonitrile, poly-paraphenyulene terephthalamide, aramids, or combinations thereof.

Table 2, below, sets for an example of a formulation of the roof mastic in accordance with the present invention, in addition to preferred or permissible ranges of each component in the formulation:

TABLE 2

| Component | Wt % | Permissible Range |
| --- | --- | --- |
| Silicone Polymer Resin | 50.0 | 40.0-70.0 |
| Pigment | 4.59 | 4.0-12.0 |
| Mineral Filler | 17.78 | 15.0-40.0 |
| Solvent | 17.19 | 5.0-23.0 |
| Strengthening Filler | 1.83 | 2.0-8.0 |
| Crosslinker 1 | 5.47 | 3.0-13.0 |
| Crosslinker 2 | 1.81 | 0.0-5.0 |
| Adhesion Promoter | 0.73 | 0.2-1.0 |
| Fiber 1 | 0.5 | 0.1-2.0 |
| Fiber 2 | 1.5 | 0.1-2.0 |
| Catalyst | 0.1 | 0.0-1.0 |

Coating

The roof coating comprises the third applied layer of the roof sealing system. As shown in FIG. 1A, the coating is applied to the entirety of the roof surface in two or more coats 530, 540. The coating is designed to be applied via spray, brush, or roller because the viscosity is generally lower than that of the caulk or mastic. In this embodiment, the roof surface is coated with one to two gallons of the roof coating per 100 square feet. This application results in a wetted thickness comprising 16 thousands of an inch per coat before curing.

In this embodiment, the roof coating may be comprised of a silicone polymer resin, strengthening fillers, mineral fillers, solvent, pigment, crosslinking agents, adhesion promoters, catalyst, and inert fiber combined under high shear mixing and blanketed by nitrogen.

In one aspect of the roof coating, the silicone polymer resin comprises a hydroxyl endcapped polydimethylsiloxane silanol fluid having a viscosity of 2,000 centipoise, specific gravity of 0.980, and refractive index of 1.4058, at 25 degrees Celsius. Condensation curing is the mechanism employed to cure the system, and achieved using the oxime crosslinking agent and catalyst discussed below.

In another aspect of the roof coating, the strengthening filler comprises a hydrophilic medium surface fumed silica having a specific surface area of 200 square meters per gram, a content of greater than 99.8% silicon dioxide, and a volume mass of 25-60 grams per liter. The strengthening filler increases tensile strength in the cured product, and must be added under high shear mixing to ensure complete dispersion.

In yet another aspect of the roof coating, the mineral filler comprises a ground crystalline silica powder having a content of 98.5% silicon dioxide, a particle size of 5.0 microns, a specific gravity of 2.65, a Hegman fineness of 7.0-7.5, and a Mohs hardness of 7.0. The mineral filler is added to increase hardness, tenacity, and volume of the finished product.

In yet another aspect of the roof coating, the cyclic siloxane solvent comprises a decamethylcyclopentasiloxane having a content of 96.0% decamethylcyclopentasiloxane. This cyclic siloxane is volatile organic compound (VOC) exempt, and gives off no VOC's during installation, curing, or its useful lifetime. The cyclic siloxane is added because the high inert fiber content of the coating necessitates a solvent to reduce the viscosity.

In this embodiment, the pigment comprises a rutile titanium dioxide pigment having a content of 91% titanium dioxide, a specific gravity of 4.0, a pH of 7.5, and an average particle size of 0.23 square micrometers. The pigment is extremely durable and improves light reflectivity of the roof sealing system, which reduces transferred heat into the structure.

In this embodiment, two crosslinking agents are used to achieve effective curing of the product. Methyltris(methylethylketoxime)silane and a blend of 90 weight percent methyltris(methylethylketoxime)silane and 10 weight percent tetra(methylethylketoxime) silane oxime crosslinking agents are utilized. Methyltris(methylethylketoxime)silane has a density of 0.9750 grams per cube centimeter at 20 Celsius and the appearance of a colorless transparent liquid. The blend of 90 percent methyltris(methylethylketoxime) silane and 10 percent tetra(methylethylketoxime) silane has a variable density and the appearance of a colorless transparent liquid. These crosslinking agents are added according to the molar quantity required to ensure the correct crosslink density in the cured product. In the presence of the dibutyltin dilaurate catalyst, these crosslinking agents react with the roofing system resulting in exposure to ambient moisture causing the formation of crosslinked, elastomeric silicones, effectively curing the product.

In this embodiment, the adhesion promoter comprises an aminoethylaminopropyl-trimethoxysilane adhesion promoter having a minimum purity of 97%, a molecular weight of 222.36 atomic mass units, a density of 1.028 grams per cube centimeter, and a boiling point of 259 Celsius. The purpose of the adhesion promoter is to improve adherence of the roofing system to the roof substrate. This is achieved by using the silane adhesion promoter as a coupling agent to provide elongation, flexibility, and spreading at the interface of the silicone polymer. This promotes adhesion between the roofing system and the roof surface by introducing reactive amino groups that facilitate adhesion between the polymer and roof surface.

In this embodiment, the catalyst comprises a tin based dibutyltin dilaurate catalyst having a tin content of 17-19%, a density of 1.07 grams per cube centimeter and a refractive index of 1.471 at 25 Celsius, and a boiling point of 204 Celsius. This catalyst is added to adjust the cure characteristics of the roofing system by promoting rapid gelation of the silicone roof sealing system and tack-free drying time. Additionally, this catalyst improves mechanical properties in the cured roof membrane.

With regard to fiber in this embodiment, the inert fiber comprises a fibrillated high density polyethylene fiber having an average length of 0.6 millimeters, diameter of 5 microns, and surface area of 12 square meters per gram. The fiber is added increase tenacity and scratch resistance in the finished product, and may increase the viscosity based on length and diameter of the fiber. The fibrillation ensures effective crosslinking, making the coating more robust.

Additionally, in this embodiment, one having ordinary skill in the art will understand that several other ingredients can be substituted in place of the ones listed. In this embodiment, substitutions can be made for the polymer resin, strengthening fillers, mineral fillers, solvent, pigment, crosslinking agents, adhesion promoter, catalyst, and fiber.

In this embodiment, the silicone resin may comprise any organosilicon compound of functionally similar viscosity to that described in this application, including, for example polydimethylsiloxanes, such as endcapped-polydimethylsiloxane, OH-endcapped polydimethylsiloxane, polyhexamethyldisiloxane, octamethyltrisiloxane, decamethyltetrasiloxane, dodecamethylpentasiloxane, polyethylsiloxane, hydroxypropyl terminated polydimethylsiloxane, hydroxyl terminated dimethyl-methylvinyl polysiloxane, hydroxyl terminated dimethyl-methylphenyl polysiloxane, hydroxyl terminated dimethyl-methylphenyl siloxane, silinol terminated dimethyl-diphenyl polysiloxane, hydroxyl terminated poly(methyl-trifluoropropyl)siloxane, or combinations thereof.

In this embodiment, the strengthening filler can comprise any hydrophylic fumed silica having similar purity and surface area as the fumed silica mentioned above.

In this embodiment, the mineral filler may be comprised of calcium carbonate, barium sulfate, iron oxide, diatomaceous earth, melamine, quartz, crystalline silica, amorphous silica, fumed silica, titanium dioxide, alumina trihydrate, zinc oxide, zirconium oxide, zirconium silicate, zinc borate, chromic oxide, crystalline silica fine powder, amorphous silica fine powder, fumed silica powder, silicone rubber powder, glass powder, silica hydrogen, silica aero gel, calcium silicate, aluminum silicate, aluminum oxide, ferrite, carbon black, graphite, mica, clay, bentonite, or any combination thereof.

In this embodiment, the solvent may be comprised of any cyclic siloxane, including, but not limited to, octamethylcyclotetrasiloxane, dodecamethylcyclohexasiloxane, decamethylcyclopentasiloxane, or any combination thereof.

In this embodiment, the pigment may be comprised of zinc oxide, antimony oxide, zirconium oxide, chromium oxide, iron oxide, lead oxide, zinc sulfide, titanium dioxide, lithopone, or any combination thereof.

In this embodiment, the crosslinking agents may comprise any ketoxime silane including, but not limited to, phenyl tris(methylethylketoxime)silane, vinyl tris(methylethylketoxime)silane, dimethyl bis(methylethylketoxime)silane, tetra(methylethylketoxime)silane, methyl tris(methylethylketoxime)silane ("MOS"), or any combination thereof.

In this embodiment, the adhesion promoter may be comprised of aminoethylaminopropyl-trimethoxysilane, 3-(2-Aminoethylamino) propyldimethoxymethylsilane, N-3-(Trimethoxysilyl)propylethylenediamine, vinyltris(2-methoxyethoxy)silane, 3-methacryloxypropyltrimethoxysilane, 2-(3,4-epoxycyclohexyl)ethyl trimethoxysilane, 3-glycidoxypropyltrimethoxysilane, 3-glycidoxypropylmethyldiethoxysilane, N-(2-aminoethyl)3-aminopropyltrimethoxysilane, 3-aminopropyltriethoxysilane, 3-(N-aminomethylbenzylamino)propyltrimethoxysilane, 3-mercaptopropyltrimethoxysilane, 3-aminopropyltris(methylethylketoxime) silane, 3-glycidoxy propyltriisopropenoxysilane, and 3-glycidoxypropylmethyldiisopropenoxysilane, or any combination thereof.

In this embodiment, the catalyst may be comprised of dibutyltin diacetate, stannous octoate, dibutyltin dioctoate, dibutyltin dilaurate, dibutyltin dimethoxide, dibutyltin bis (acetylacetonate), dibutyltin bis(benzylmalate), dimethyltin dimethoxide, dimethyltin diacetate, dioctyltin dioctate, dioctyltin dilaurate, tin dioctate, tin laulate, tetraisopropyl titanate, tetra-n-butyl titanate, tetra-tertiary butyl titanate, tetra-n-propyl titanate, tetra-2-ethylhexyl titanate, diisopropyl di-tertiary butyl titanate, dimethoxy titanium bisacetylacetonate, diisopropoxy titanium bisethyl acetoacetate, di-tertiary butoxy titanium bisethyl acetoacetate, and di-tertiary butoxy titanium bismethyl acetoacetate, or any combination thereof.

In this embodiment, the fiber may be comprised of any polymer, natural fibers such as cotton, flax, jute, hemp or sisal, cellulose, ceramic, glass or the like. In accordance with this embodiment, the fiber may be a plant fiber, mineral fiber, synthetic fiber, regenerated fiber, or semi-synthetic fiber. Synthetic fibers may be selected from the group consisting of polyethylene, polyethylene terephthalate, polyurethane, polypropylene, polyester, polyamide, nylon, polyacrylonitrile, poly-paraphenyulene terepthalamide, aramids, or combinations thereof.

Table 3, below, sets for an example of a formulation of the roof coating in accordance with the present invention, in addition to preferred or permissible ranges of each component in the formulation:

TABLE 3

| Component | Wt % | Permissible Range |
|---|---|---|
| Silicone Polymer Resin | 50.0 | 40.0-70.0 |
| Pigment | 4.59 | 4.0-12.0 |

TABLE 3-continued

| Component | Wt % | Permissible Range |
|---|---|---|
| Mineral Filler | 17.78 | 15.0-40.0 |
| Solvent | 17.19 | 5.0-23.0 |
| Strengthening Filler | 1.83 | 2.0-8.0 |
| Crosslinker 1 | 5.47 | 3.0-13.0 |
| Crosslinker 2 | 1.81 | 0.0-5.0 |
| Adhesion Promoter | 0.73 | 0.2-1.0 |
| Fiber | 0.5 | 0.1-2.0 |
| Catalyst | 0.1 | 0.0-1.0 |

System Operation

In one embodiment of the operation of the system, the three components are applied in series to a roof to create a seamless, watertight membrane on the roof surface. The roof sealing system can be applied on an existing membrane roof (such as PVC, EPDM, or Bitumen-based) or directly on to the decking. As shown in FIG. 1A, the method of operating the system may comprise the steps of clearing the roof of debris 500, applying the roof caulk to fill larger gaps in the substrate of the roof 510, and seal any penetrations around pipes, vents, edges, joints, seams, and cracks 510, applying the mastic over the caulk to create a sealed barrier and build up valleys and dips in the roof 520 to prevent water from pooling on the coating wherein the mastic smooths the surface in preparation for application of the coating 520, applying the roof coating to the entirety of the roof 530, in two or more applications 540 with a roller, brush, or spray, to completely seal the surface of the roof, and allowing the system to cure 550.

In one embodiment, the silicone coating adheres to itself to form one solid sheet of silicone polymer encompassing the entirety of the roof surface. This embodiment forms a watertight barrier that does not have seams or weak points. The coating cures from ambient moisture in the atmosphere via the well-understood process of condensation curing. In areas of higher ambient moisture, cure time is lower. In this embodiment, cure time may be between three and eight hours, nominally. Additionally, in this embodiment, the inert polyethylene fibers do not necessitate any fabric reinforcing layer, and the lower viscosity of the roof sealing system allows for complete adherence to the roof surface without the need for additional adhesives.

Method of Manufacture

In one embodiment, the three components are manufactured in a similar method with some variation in viscosity due to different length inert fibers, and the addition of the cyclic siloxane solvent in the mastic and the coating. In this embodiment, as shown in FIG. 2A, hydroxyl endcapped polydimethylsiloxane silicone polymers are added to a mixing vessel 100 and combined with crystalline ground silica mineral fillers to enhance hardness 110. Next, under high shear mixing, hydrophylic fumed silica strengthening fillers are added to enhance tensile strength of the cured product 120. In the roof mastic 180 and roof coating 140, cyclic siloxane is then added as a solvent to reduce viscosity. The cyclic solvent is allowed to disperse until a Hegman test shows a grind of 7H or better. Decamethylcyclopentasiloxane is used as the cyclic siloxane solvent. High shear mixing ensures complete dispersion of the solvent. Titanium dioxide pigment paste is then added to the mixing vessel 130, 190, 250. The pigment paste is allowed to rest prior to being added to the mixing vessel to allow any entrained air to disperse. A nitrogen purge is utilized to expel any excess air and moisture 310. Methyl-tris-(methylethylketoxime) silane ("MOS") and a blend of 90 weight percent MOS and 10 weight percent tetra(methylethylketoxime) silane oxime crosslinking agents ("90/10 Crosslinker") are then added according to the molar quantity required to ensure a desired crosslink density in the cured product 140, 200, 260. An aminoethylaminopropyl-trimethoxysilane adhesion promoter is added to ensure effective adherence to roofing substrates 150, 210, 270. Dibutyltin dilaurate catalyst is then added to adjust the cure characteristics 160, 220, 280. All ingredients are mixed until they are homogenized completely, still under the nitrogen purge 310. Finally, fibrillated polyethylene fibers are added to the mixture to increase tenacity and scratch resistance. In this embodiment, one fiber size is added to the caulk 170 and the coating 290, and two fiber sizes are added to the mastic 230. The caulk, mastic, and coating are then ready for packaging and consumer use 300.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

The invention claimed is:

1. A roof sealing system capable of being applied to a roof substrate, comprising:
   a sealing caulk comprising polydimethylsiloxane present in about 50 wt % to about 70 wt % of the sealing caulk;
   a mastic comprising about 50 wt % to about 70 wt % polydimethylsiloxane and decamethylcyclopentasiloxane solvent present in about 15 wt % to about 40 wt % of the mastic;
   a coating comprising about 50 wt % to about 70 wt % polydimethylsiloxane and decamethylcyclopentasiloxane solvent present in about 15 wt % to about 40 wt % of the coating; and
   high density polyethylene fibers having an average length of about 0.6 to about 0.7 mm, a diameter of between about 5 to about 15 microns; and a surface area of about 8 to 12 sq. meters per gram present in the sealing caulk, the mastic, and the coating in about 0.1 to about 0.4 wt % of each of the sealing caulk, the mastic and the coating.

2. The roof sealing system of claim 1, wherein each of the sealing caulk, the mastic, and the coating further comprise hydrophilic fumed silica present in about 2 to about 8 wt % of each of the sealing caulk, the mastic, and the coating.

3. The roof sealing system of claim 2, further comprising a pigment present in each of the sealing caulk, the mastic, and the coating in the range of about 4 wt % to about 13 wt %.

4. The roof sealing system of claim 3, further comprising a mineral filler present in each of the sealing caulk, the mastic, and the coating, wherein the mineral filler is present in about 15 to about 40 wt % of each of the sealing caulk, the mastic, and the coating.

5. The roof sealing system of claim 4, wherein the mineral filler is selected from the group consisting of calcium carbonate, barium sulfate, iron oxide, diatomaceous earth, melamine, quartz, crystalline silica, amorphous silica, fumed silica, titanium dioxide, alumina trihydrate, zinc oxide, zirconium oxide, zirconium silicate, zinc borate, chromic oxide, crystalline silica powder, fumed silica powder, silicone rubber powder, glass powder, silica hydrogen, silica aero gel, calcium silicate, aluminum silicate, aluminum oxide, ferrite, carbon black, graphite, mica, clay, bentonite, and combinations thereof.

6. The roof sealing system of claim 4, wherein the mineral filler further comprises crystalline silica powder having an average particle size of about 5 microns.

7. The roof sealing system of claim 6, further comprising a strengthening filler present in each of the sealing caulk, the mastic, and the coating at about 2.0 to about 8.0 wt %.

8. The roof sealing system of claim 7, wherein the strengthening filler further comprises hydrophilic fumed silica having a surface area of about 200 square meters per gram.

9. The roof sealing system of claim 7, further comprising a crosslinking agent present at about 2.0 to about 13.0 wt % of each of the sealing caulk, the mastic, and the coating.

10. The roof sealing system of claim 9, wherein the crosslinking agent further comprises methytris(methylethylketoxime)silane.

11. The roof sealing system of claim 1, further comprising an adhesion promoter present in each of the sealing caulk, the mastic, and the coating at about 0.2 to about 1.0 wt %.

12. The roof sealing system of claim 11, wherein the adhesion promoter further comprises aminoethyl aminopropyltrimethoxysilane.

13. A roof sealing system capable of being applied to a roof substrate, consisting essentially of:
   a. a sealing caulk comprising polydimethylsiloxane present in about 50 wt % to about 70 wt % of the sealing caulk;
   b. a mastic comprising about 50 wt % to about 70 wt % polydimethylsiloxane and decamethylcyclopentasiloxane solvent present in about 15 wt % to about 40 wt % of the mastic;
   c. a coating comprising about 50 wt % to about 70 wt % polydimethylsiloxane and decamethylcyclopentasiloxane solvent present in about 15 wt % to about 40 wt % of the coating;
   d. at least one fiber selected from the group of plant fiber, mineral fiber, synthetic fiber, regenerated fiber, and semi-synthetic fiber;
   e. a mineral filler present in each of the sealing caulk, the mastic, and the coating, wherein the mineral filler is present in about 15 to about 40 wt % of each of the sealing caulk, the mastic, and the coating;
   f. a strengthening filler present in each of the sealing caulk, the mastic, and the coating at about 2.0 to about 8.0 wt %;
   g. a crosslinking agent present at about 2.0 to about 13.0 wt % in each of the sealing caulk, the mastic, and the coating;
   h. a catalyst present at about 0.1 to about 1.0 wt % of each of the sealing caulk, the mastic, and the coating;
   i. a pigment present in each of the sealing caulk, the mastic, and the coating in the range of about 4 wt % to about 13 wt %; and
   j. an adhesion promoter present in each of the sealing caulk, the mastic, and the coating at about 0.2 to about 1.0 wt %.

14. The roof sealing system of claim 13, wherein the at least one fiber further comprises a synthetic fiber selected from the group consisting of polyethylene, polyethylene terephthalate, polyurethane, polypropylene, polyester, polyamide, nylon, polyacrylonitrile, poly-paraphenylene terepthalamide, and aramids, the at least one fiber being present in the sealing caulk, the mastic, and the coating in about 0.1 to about 0.4 wt % of each of the sealing caulk, the mastic and the coating.

15. The roofing sealing system of claim 14, wherein the synthetic fiber comprises high density polyethylene fibers having an average length of about 0.6 to about 0.7 mm, a diameter of between about 5 to about 15 microns; and a surface area of about 8 to 12 sq. meters per gram.

16. The roofing system of claim 13, wherein the strengthening filler further comprises hydrophilic fumed silica.

17. The roofing system of claim 13, wherein the pigment further comprises rutile titanium dioxide.

18. The roofing system of claim 13, wherein the crosslinking agent further comprises methyltris(methylethyleneketoxime)silane.

19. The roofing system of claim 13, wherein the catalyst further comprises dibutyltin dilaurate.

20. The roofing system of claim 13, wherein the adhesion promoter further comprises aminoethyl aminopropyltrimethoxysilane.

* * * * *